United States Patent
Pu

(10) Patent No.: US 10,307,790 B2
(45) Date of Patent: Jun. 4, 2019

(54) VIBRATION MOTOR

(71) Applicant: Yonghua Pu, Shenzhen (CN)

(72) Inventor: Yonghua Pu, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 363 days.

(21) Appl. No.: 15/297,532

(22) Filed: Oct. 19, 2016

(65) Prior Publication Data

US 2017/0189937 A1 Jul. 6, 2017

(30) Foreign Application Priority Data

Dec. 30, 2015 (CN) .................... 2015 2 1128997 U

(51) Int. Cl.
*H02K 33/00* (2006.01)
*B06B 1/04* (2006.01)
*H02K 33/16* (2006.01)

(52) U.S. Cl.
CPC ............. *B06B 1/045* (2013.01); *H02K 33/00* (2013.01); *H02K 33/16* (2013.01)

(58) Field of Classification Search
CPC .............................. H02K 33/00; H02K 33/16
USPC ................................................ 310/36–37, 15
See application file for complete search history.

(56) References Cited

U.S. PATENT DOCUMENTS

| | | | | |
|---|---|---|---|---|
| 8,269,379 B2* | 9/2012 | Dong | .................... | H02K 33/16 310/25 |
| 8,288,899 B2* | 10/2012 | Park | ....................... | H02K 33/16 310/25 |
| 8,624,450 B2* | 1/2014 | Dong | .................... | H02K 33/16 310/15 |
| 8,987,951 B2* | 3/2015 | Park | ....................... | H02K 33/16 310/12.22 |
| 9,350,220 B2* | 5/2016 | Kuroda | ................... | H02K 33/12 |
| 9,553,497 B2* | 1/2017 | Kim | ....................... | B06B 1/045 |
| 9,614,425 B2* | 4/2017 | Jin | ......................... | H02K 33/16 |
| 2013/0099600 A1* | 4/2013 | Park | ....................... | B06B 1/045 310/15 |
| 2014/0152126 A1* | 6/2014 | Kim | ....................... | B06B 1/045 310/25 |

* cited by examiner

*Primary Examiner* — Alexander Talpalatski
(74) *Attorney, Agent, or Firm* — Na Xu; IPro, PLLC

(57) ABSTRACT

A vibration motor is disclosed. The vibration motor includes a vibration part including a weight and a magnet accommodated in the weight; a fixation part including a housing having an accommodation space, a circuit board fixed in the housing, and a coil opposed to the magnet and connected with the circuit board electrically, the housing including an upper cover, a lower cover opposite to the upper cover, and an outer frame forming the accommodation space with the upper and lower covers; an elastic connector having for elastically suspending the vibration part in the accommodation space of the housing; and an anti-drop protective structure arranged on the outer frame and applied to protection of the elastic connector from collision with the housing when the vibration motor drops.

7 Claims, 3 Drawing Sheets

VIBRATION MOTOR

FIELD OF THE INVENTION

The present invention relates to a vibration motor.

DESCRIPTION OF RELATED ART

A vibration motor is a kind of component which converts the electric energy into the mechanical energy by using the electromagnetic force. The vibration motor is usually installed inside a portable mobile device to produce vibration feedback, for example, the vibration of mobile phone or the vibration feedback of game player.

A related vibration motor of relevant technologies comprises a housing having an accommodation space, a vibration part arranged in the accommodation space, a fixation part and an elastic connector for suspending the vibration part in the accommodation space. One end of the elastic connector is connected with the vibration part, and the other end thereof is connected with the housing. Moreover, the elastic connector may make a noise easily during colliding with the housing, or even lead to failure of the elastic connector when the vibration motor drops.

Therefore, it is necessary to provide a kind of new technology solution to overcome above disadvantage.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
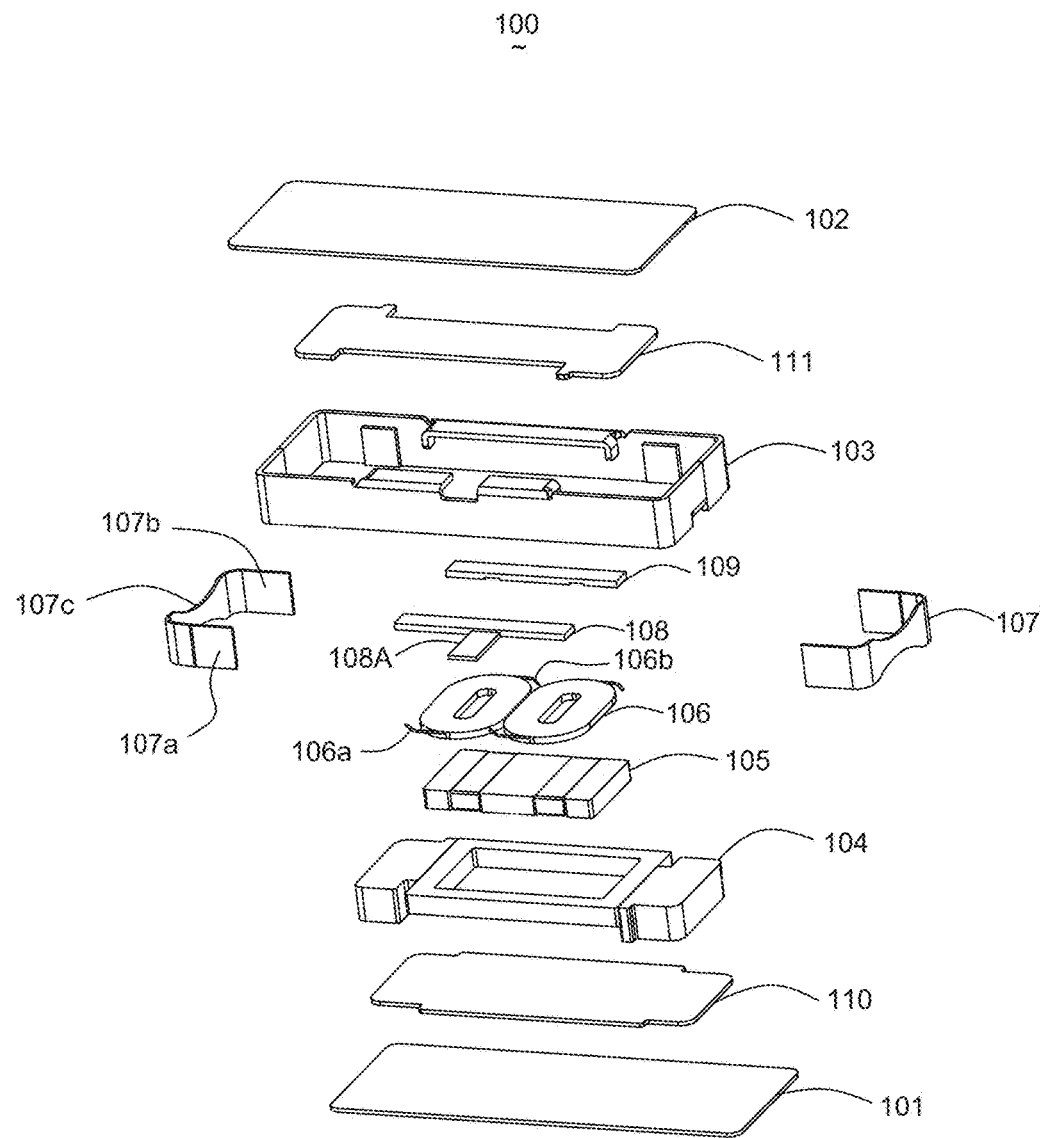
FIG. 1 is an isometric and exploded view of a vibration motor in accordance with an exemplary embodiment of the present disclosure.
Figure 2:
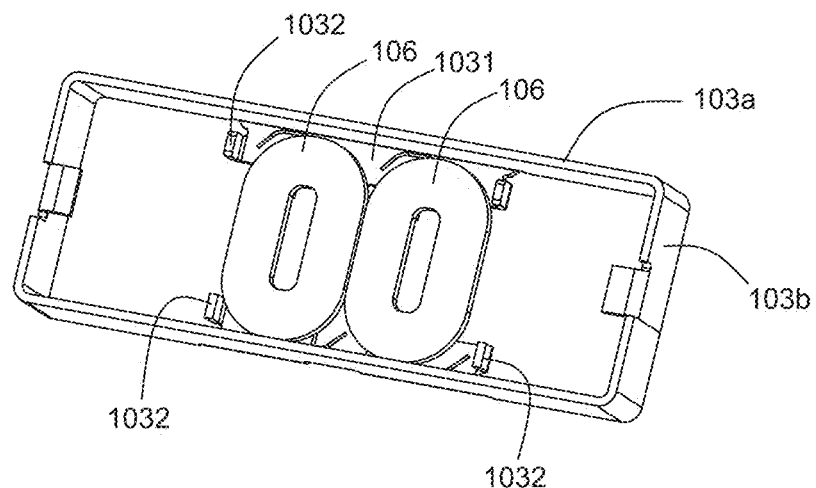
FIG. 2 is an illustration of an assembly of an outer frame and a coil of the vibration motor in FIG. 1.

A vibration motor 100, in accordance with an exemplary embodiment of the present disclosure, comprises a vibration part, a fixation part and an elastic connector 107, as shown in FIGS. 1-2.

The vibration part comprises a weight 104, a magnet 105 accommodated in the weight 104, a first pole plate 110 and a second pole plate 111 which cover an upper surface and a lower surface of the weight 104 respectively. The elastic connector 107 comprises a first fixation portion 107a connecting with the weight 104, a second fixation portion 107b connecting with the housing and a middle connection portion 107c connecting the first fixation portion 107a and the second fixation portion 107b. Moreover, the vibration part is suspended in the housing elastically by the elastic connectors 107.

The fixation part comprises a housing having an accommodation space, a circuit board and coils 106 fixed in the housing and connecting with the circuit board electrically. The coils 106 and the magnet 106 are arranged oppositely to each other. The housing comprises an upper cover 101, a lower cover 102 arranged opposite to the upper cover 101, and an outer frame 103 forming the accommodation space with the upper cover 101 and the lower cover 102. The outer frame 103 comprises two long side walls 103a which are arranged oppositely and two short side walls 103b which are arranged oppositely. Moreover, two coils 106 having anode leads 106a and cathode leads 106b are available.

Figure 3:
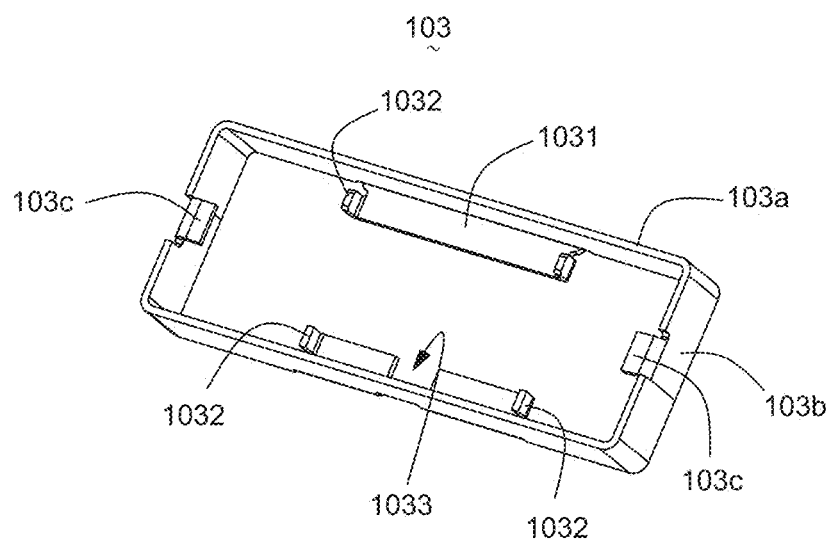
FIG. 3 is an isometric view of the outer frame in FIG. 2.

Two long side walls 103a are provided with coil fixation portion for fixing the coils 106 respectively, as shown in FIG. 3; two short side walls 103b are provided with anti-drop protective structures for preventing the elastic connectors 107 from collision with the housing when the vibration motor 100 drops. The coil fixation portions have bearing walls 1031 which extend to the direction of the accommodation space from the long side walls 103a in the form of zigzag and the bended portions 1032 which extend toward the upper cover 101 respectively from the two ends of the bearing walls 1031 in the form of zigzag. The anti-drop protective structure is a bended sheet 103c which extends towards the accommodation space from the short side wall 103b in the form of zigzag; and the middle connection portion 107c of the elastic connector 107 is abutted against the bended sheet 103c. Moreover, the bended sheet 103c can bear the middle connection portion 107c of the elastic connector 107, and therefore can avoid noise generated upon collision between the elastic connector 107 and the housing and prevent the elastic connector 107 from failure as a result of collision.

The circuit board comprises a first circuit board 108 and a second circuit board 109 which are arranged on the two bearing walls 1031 respectively. Further, the bearing wall 1031 where the first circuit board 108 is located is also provided with an avoiding portion 1033 for avoiding an extension portion 108A.

Figure 4:
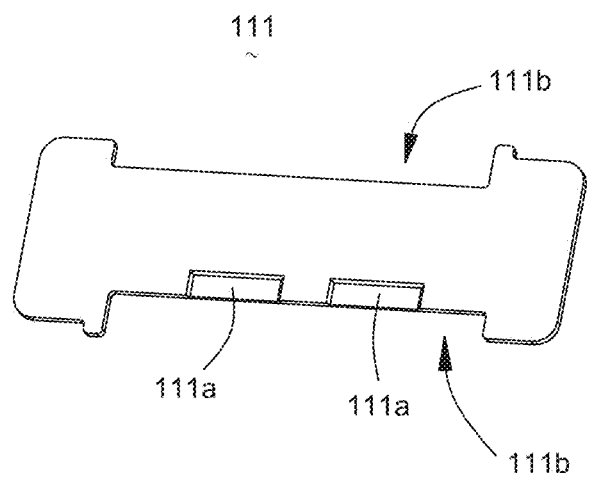
FIG. 4 is an isometric view of a second pole plate of the vibration motor in FIG. 1.

The first circuit board 108 has the extension portion 108A which extends out of the accommodation space and is applied to connection of the external power supply. Two ends of the first circuit board 108 and two ends of the second circuit board 109 all abut against the bended portions 1032 which are located at the two ends of the bearing walls 1031. Therefore, the connection is firmer. The coils 106 are arranged among two bearing walls 103; the anode lead 106 is connected with the first circuit board 108 electrically; and the cathode lead 106b is connected with the second circuit board 109 electrically and extends towards the direction of the accommodation space. Accommodation portions 111b for accommodating the baring walls 1031 are arranged at the locations of the second pole plate 111 corresponding to the bearing walls 1031, as shown in FIG. 4; the dimensions and shapes of the accommodation portions 111b should fit the bearing walls 1031; and the bearing walls 1031 are positioned in the accommodation portions 111b. Moreover, a concave portion 111a for avoiding the cathode lead 106b is also arranged at the position of the second pole plate 111 which faces the surface of the coils 106 and corresponds to the cathode lead 106.

The coils are supported by using the coil fixation portion which is arranged on the outer frame 103 in the vibration motor of the utility model; therefore, the coils can be separated from the upper cover and the lower cover, and assembling will become easier because the upper cover and the lower cover without coil will not be interfered by the pole plate during assembling the upper cover and the lower cover.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
a vibration part including a weight and a magnet accommodated in the weight;
a fixation part including a housing having an accommodation space, a circuit board fixed in the housing, and a coil opposed to the magnet and connected with the circuit board electrically, the housing including an upper cover, a lower cover opposite to the upper cover, and an outer frame forming the accommodation space with the upper and lower covers;
an elastic connector having for elastically suspending the vibration part in the accommodation space of the housing;
an anti-drop protective structure arranged on the outer frame and applied to protection of the elastic connector from collision with the housing when the vibration motor drops;
wherein the outer frame comprises two long side walls which are arranged oppositely and two short side walls which are connected with and opposite to the two long side walls; and the anti-drop protective structure is arranged on the short side walls;
wherein a coil fixation portion for fixing the coils is also arranged on the outer frame and on the long side walls; and
wherein the coil fixation portion comprises bearing walls which extend to the accommodation space in the form of zigzag from the two long side walls respectively; the circuit board comprises a first circuit board and a second circuit board which are arranged on the two bearing walls respectively; one end of the coil is provided with an anode lead, and the other end thereof is provided with a cathode lead; the anode lead is connected with the first circuit board electrically, and the cathode lead is connected with the second circuit board electrically.

2. The vibration motor as described in claim 1, wherein the elastic connector comprises a first fixation portion which is connected with the weight, a second fixation portion which is connected with the long side walls and a middle connection portion which connects the first fixation portion with the second fixation portion; the anti-drop protective structure refers to a bended sheet extending from the short side walls to the accommodation space in the form of zigzag; and the middle connection portion abuts against the bended sheet.

3. The vibration motor as described in claim 1, wherein bended portions which extend along the direction facing the upper cover respectively in the form of zigzag are arranged on two ends of the bearing walls; and the two ends of the first circuit board and the second circuit board are abutted against the bended portions respectively.

4. The vibration motor as described in claim 1, wherein an extension portion which extends out from the accommodation space and is applied to electric connection with the external power supply is arranged on the first circuit board; and the bearing wall where the first circuit board is positioned is also provided with an avoiding portion for avoiding the extension portion.

5. The vibration motor as described in claim 1, wherein the vibration part also comprises a first pole plate covering the surface of the weight facing the upper cover and a second pole plate covering the surface of the weight facing the lower cover.

6. The vibration motor as described in claim 5, wherein accommodation portions for accommodating the bearing walls are also arranged at the corresponding locations of second pole plate and the bearing walls; and bearing walls are positioned in the accommodation portions.

7. The vibration motor as described in claim 6, wherein the cathode lead extends towards the accommodation space; and a concave part for avoiding the cathode lead is also arranged on the surface of the second pole plate which faces the coils and corresponds to the location of the cathode lead.

* * * * *